United States Patent [19]

Cucheran et al.

[11] Patent Number: 5,579,970
[45] Date of Patent: Dec. 3, 1996

[54] LOCKING SYSTEM FOR ADJUSTABLE LUGGAGE CARRIER

[75] Inventors: John S. Cucheran, Lake Orion; Jeffrey M. Aftanas, Wyandotte, both of Mich.

[73] Assignee: JAC Products, Inc., Ann Arbor, Mich.

[21] Appl. No.: 462,788

[22] Filed: Jun. 5, 1995

Related U.S. Application Data

[63] Continuation of Ser. No. 120,939, Sep. 14, 1993, abandoned.

[51] Int. Cl.⁶ ...................................................... B60R 9/00
[52] U.S. Cl. ........................................... 224/321; 224/326
[58] Field of Search .................................. 224/309, 321, 224/325, 326, 315

[56] References Cited

U.S. PATENT DOCUMENTS

| | | |
|---|---|---|
| Re. 26,309 | 11/1967 | Heard . |
| 160,462 | 3/1875 | Palmer . |
| D. 314,541 | 2/1991 | Bott . |
| D. 314,542 | 2/1991 | Bott . |
| D. 317,744 | 6/1991 | Bott . |
| 2,121,531 | 6/1938 | Murphy . |
| 2,663,472 | 12/1953 | Belgau . |
| 2,688,504 | 9/1954 | Parker . |
| 3,165,353 | 1/1965 | Weise . |
| 3,212,457 | 10/1965 | Looker . |
| 3,227,102 | 1/1966 | Shook . |
| 3,241,501 | 3/1966 | Watts . |
| 3,399,635 | 9/1968 | Heard . |
| 3,554,416 | 1/1971 | Bott . |
| 3,721,200 | 3/1973 | Schmidt . |
| 3,774,939 | 11/1973 | Freads et al. . |
| 3,776,437 | 12/1973 | Carney . |
| 3,782,295 | 1/1974 | Balinski . |
| 3,952,671 | 4/1976 | Verde . |
| 4,020,769 | 5/1977 | Keir . |
| 4,085,684 | 4/1978 | McLennan et al. . |
| 4,099,658 | 7/1978 | Bott . |
| 4,132,335 | 1/1979 | Ingram . |
| 4,133,465 | 1/1979 | Bott . |
| 4,162,755 | 7/1979 | Bott . |
| 4,182,471 | 1/1980 | Bott . |
| 4,243,253 | 1/1981 | Rogers, Jr. . |
| 4,256,424 | 3/1981 | Knox et al. . |
| 4,269,340 | 5/1981 | Kowalski et al. . |
| 4,274,570 | 6/1981 | Bott . |
| 4,295,587 | 10/1981 | Bott . |
| 4,323,182 | 4/1982 | Bott . |
| 4,364,500 | 12/1982 | Bott . |
| 4,396,175 | 8/1983 | Long et al. . |
| 4,406,386 | 9/1983 | Rasor et al. . |
| 4,431,123 | 2/1984 | Bott . |
| 4,448,337 | 5/1984 | Cronce ................................. 224/321 |
| 4,473,178 | 9/1984 | Bott . |
| 4,493,470 | 1/1985 | Engel . |

(List continued on next page.)

FOREIGN PATENT DOCUMENTS

672249  10/1964  Italy .

*Primary Examiner*—Linda J. Sholl
*Attorney, Agent, or Firm*—Harness, Dickey & Pierce, P.L.C.

[57] ABSTRACT

A vehicle article carrier having a locking mechanism disposed within a bracket member. The locking mechanism includes an actuating member having first and second camming surfaces, a locking pin and a clamping member. As the actuating member is moved to an unlocked position, the first camming surface cooperates with the locking pin to urge the locking pin out of engagement with an aperture in a channel of a support member of the vehicle article carrier. Simultaneously, the second camming surface causes the clamping member to be moved out of clamping engagement with shoulder portions of the channel member. When the actuating member is moved from the unlocked to the locked position, the first camming surface allows a first spring to urge the locking pin back into engagement with the aperture in the channel member. Simultaneously, the rotation of the actuating member causes the second camming surface to allow the clamping member to be urged back into clamping engagement in response to a biasing force provided by another spring. Accordingly, a dual locking and unlocking action is provided with movement of a single actuating member.

20 Claims, 3 Drawing Sheets

U.S. PATENT DOCUMENTS

| | | |
|---|---|---|
| 4,496,271 | 1/1985 | Spinosa et al. . |
| 4,509,888 | 4/1985 | Sheek . |
| 4,516,710 | 5/1985 | Bott . |
| 4,650,383 | 3/1987 | Hoff . |
| 4,684,048 | 8/1987 | Bott . |
| 4,688,843 | 8/1987 | Hall . |
| 4,708,549 | 11/1987 | Jensen . |
| 4,754,905 | 7/1988 | Bott . |
| 4,771,969 | 9/1988 | Dowd . |
| 4,838,467 | 6/1989 | Bott et al. . |
| 4,899,917 | 2/1990 | Bott . |
| 4,911,348 | 3/1990 | Rasor et al. ............................. 224/321 |
| 4,967,945 | 11/1990 | Bott . |
| 4,972,983 | 11/1990 | Bott . |
| 4,982,886 | 1/1991 | Cucheran . |
| 5,082,158 | 1/1992 | Bott . |
| 5,190,198 | 3/1993 | Cucheran ............................... 224/321 |

LOCKING SYSTEM FOR ADJUSTABLE LUGGAGE CARRIER

This is a continuation of U.S. patent application Ser. No. 08/120,939 filed Sep. 14, 1993 now abandoned.

BACKGROUND OF THE INVENTION

1. Technical Field

This invention relates to vehicle article carriers, and more particularly to a locking mechanism for a bracket member for adjustably, releasably securing the bracket member and a cross bar attached thereto at a plurality of locations along a support member.

2. Discussion

Vehicle article carriers are used on a wide variety of vehicles to support and transport cargo and other items, where such items are either too large to fit in an interior area of the vehicle or otherwise more conveniently transported on the outside of the vehicle. In such vehicle article carrier systems, a pair of support members is typically employed. Each support member is secured to an outer body vehicle surface such as a roof of the vehicle and positioned longitudinally along the roof portion of the vehicle such that each extends from the front of the vehicle to the rear of the vehicle along outermost side portions of the vehicle roof. Such systems typically further employ some form of bracket member which may be slidably, releasably disposed along each of the support members. The bracket members are typically secured to a cross bar extending therebetween for supporting cargo or other like items above the vehicle body roof or for helping to secure cargo or other like items to the vehicle body roof via straps, cords or other like implements. In the latter case, one or more elongated support strips may be secured to the vehicle body surface between the support members to prevent the outer body vehicle surface from becoming scratched, marred or otherwise damaged by the cargo.

For allowing each of the bracket members, and thus the cross bar, to be positioned at a desired location along the support members, each bracket member typically includes some form of locking device for cooperating with the support member to secure the bracket member releasably at various positions along the length of each support member. In addition, some form of actuating means is typically incorporated to enable the locking device within each bracket member to be released from locking engagement, to thereby permit adjustment of each bracket member along its associated support member, and to allow each bracket member to be locked at a desired position.

Patents involving vehicle article carrier systems and disclosing various forms of novel and non-obvious actuating mechanisms are disclosed in, for example, U.S. Pat. Nos. 4,684,048, 4,754,905 and 4,972,983, each to John A. Bott. The disclosures of each of these patents are hereby incorporated by reference.

While the vehicle article carrier systems disclosed in the above-mentioned patents have each proven to be a significant success, it would nevertheless be desirable to provide a bracket member having a locking mechanism therein which even more positively operates to secure a bracket member to a support member.

Accordingly, it is a principal object of the present invention to provide a vehicle article carrier system which incorporates a pair of bracket members which each include locking mechanisms therein for even more positively releasably securing the bracket member to an associated support member at a plurality of desired positions along the length of the support member.

It is yet another object of the present invention to provide a vehicle article carrier which includes a bracket member securable to an associated support member, where the bracket member includes an actuating member which may be easily moved by an operator between a locked and an unlocked position to thereby allow the bracket member to be releasably, adjustably secured to the support member at a particular desired position along the support member or released from locking engagement to permit the bracket member to be slidably positioned along the support member at a different desired position.

It is yet a further object of the present invention to provide a vehicle article carrier having a bracket member releasably, adjustably enageable with an associated support member, where the bracket member includes a locking mechanism therein which is constructed simply with a relatively small number of component parts, and which enables the bracket member to be very positively secured at specific, desired locations along the length of the support member.

SUMMARY OF THE INVENTION

The above and other objects are accomplished by a locking system for a vehicle article carrier in accordance with a preferred embodiment of the present invention. The vehicle article carrier generally comprises a pair of support members fixedly secured to an outer body vehicle surface of a vehicle, a pair of bracket members releasably, adjustably securable to each of the support members, and a cross bar extending between the bracket members for supporting cargo and other like items above the outer body vehicle surface.

In the preferred embodiment each of the support members includes a channel formed therein having a plurality of spaced apart apertures in a wall portion thereof and at least one inwardly extending shoulder portion. Each bracket member further includes locking means therein which comprises a locking pin and a clamping member. The locking pin and clamping member are disposed in operable relationship with an actuating member having a first camming surface and a second camming surface. Movement of the actuating member from a locked to an unlocked position causes the first camming surface to allow the locking pin to be withdrawn from a bottom wall of the channel. The same movement causes the second camming surface to allow the clamping member to be moved out of clamping engagement with the channel. Movement of the actuating member from the unlocked position to the locked position, however, causes the first camming surface to urge the locking pin into engagement with a selected one of the apertures. The same movement causes the second camming surface to urge the clamping member into clamping engagement with the inwardly extending shoulder portion of the channel.

In the preferred embodiment the actuating member includes a manually graspable end portion which fits compactly against an inner side of the bracket member when the actuating member is in the locked position. Accordingly, the actuating member has the appearance of being an integrally formed component with the bracket member when in the locked position.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENT

Figure 1:
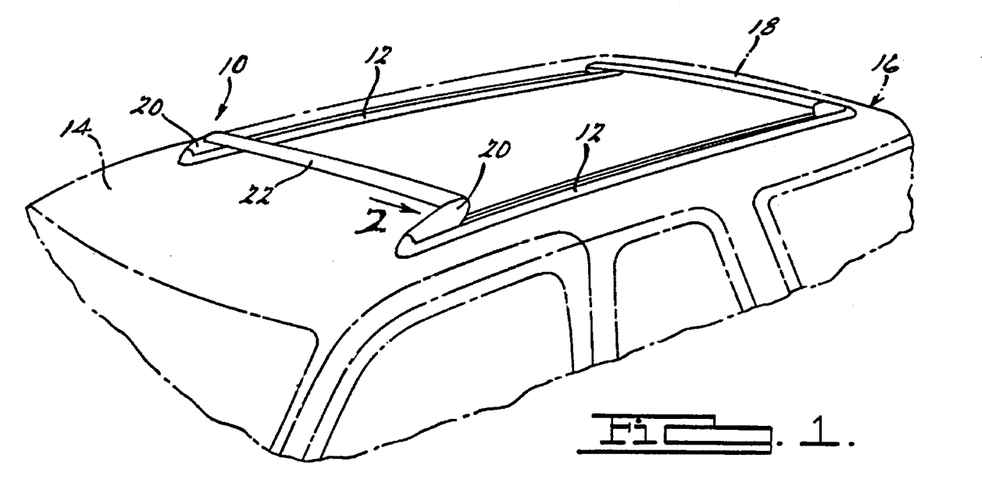
FIG. 1 is a perspective view of a vehicle article carrier in accordance with a preferred embodiment of the present invention.

Referring to FIG. 1, there is shown a vehicle article carrier 10 in accordance with a preferred embodiment of the present invention. The vehicle article carrier 10 generally comprises a pair of elongated, longitudinally extending support members 12 fixedly secured to an auto body vehicle surface 14 of a vehicle 16, a fixed cross bar 18, a pair of bracket members 20 releasably, adjustably coupled to the support members 12, and an adjustable cross bar 22 extending between the bracket members 20 and coupled at its outermost ends to each of the bracket members 20. The vehicle article carrier 10 allows luggage or other like items to be supported above the outer body vehicle surface 14 on the adjustable cross bar 22 and the fixed cross bar 18. Since the adjustable cross bar 22 may be moved longitudinally along the support members 12 via the bracket members 20, a wide variety of differently shaped articles of varying size may be transported on the cross bars 18 and 20 when suitable straps, cords or other like implements are used to secure such articles to the cross bars 18 and 22.

Figure 2:
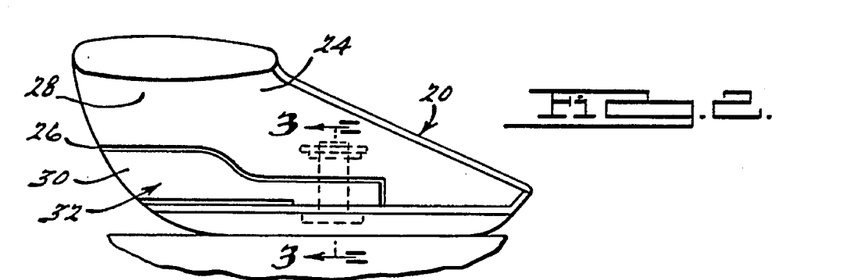
FIG. 2 is an elevational view of an inside portion of one of the bracket members shown in FIG. 1 taken in accordance with section line 2—2 in FIG. 1.

Referring to FIG. 2, one of the bracket members 20 is shown in greater detail. Initially, it should be understood that the bracket members 20 are preferably identical to each other (i.e., mirror images of each other). The bracket member 20 shown in FIG. 2 comprises a housing 24 having a recessed portion 26 on an inner surface 28 thereof. The recessed portion 26 is shaped to accommodate a manually graspable end portion 30 of an actuating member 32 such that the end portion 30 is housed within the recessed portion 26 to provide the appearance of a single, integrally formed structure when the actuating member 32 is in a locked position, as shown in FIG. 2.

Figure 3:
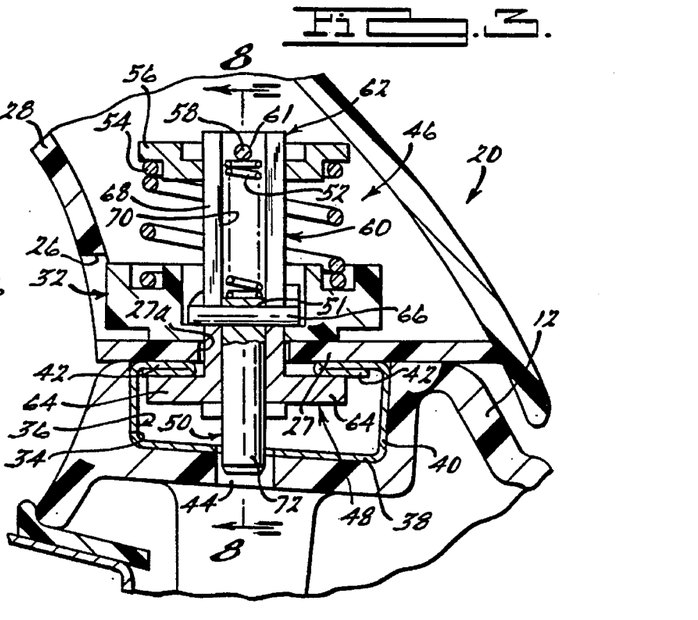
FIG. 3 is a cross sectional side view of the bracket of FIG. 2 as taken in accordance with section line 3—3 in FIG. 2.

Referring now to FIG. 3, the bracket member 20 of FIG. 2 is shown releasably, adjustably coupled to an associated one of the support members 12, in cross section, to more fully illustrate the internal components and inter-working relationship of the bracket member 20 and the support member 12. Beginning with the support member 12, an upwardly opening channel 34 is formed therein. The channel 34 holds a channel member 36 having a bottom wall portion 38, a pair of side portions 40 and a pair of inwardly extending shoulder portions 42. The bottom wall portion 38 and the inwardly extending shoulder portions 42 are further formed so as to be disposed generally parallel to the outer body vehicle surface 14. The bottom wall portion 38 further includes a plurality of apertures 44 (only one of which is visible in FIG. 3).

Turning now to the bracket member 20, a locking mechanism 46 is housed therein. The locking mechanism 46 is generally comprised of the actuating member 32, a clamping member 48, a locking pin 50, first biasing means in the form of a first spring 52 for biasing the locking pin 50 between a locked and an unlocked position within one of the apertures 44, and second biasing means in the form of a second spring 54 for biasing the clamping member 48 between clamped and unclamped positions.

The locking mechanism 46 further includes an annular retaining member 56 and a first retaining pin 58. The clamping member includes a neck portion 60 having an upper end portion 62, and clamping portions 64. The retaining pin 58 is disposed within an aperture 61 in the upper end portion 62 and is biased upwardly in the drawing of FIG. 3 by the second spring 54 and the annular retaining member 56, thereby tending to urge the clamping member 48 upwardly such that the clamping portions 64 are urged into clamping engagement with the shoulder portions 42 of the channel member 36. The bracket member 20 includes a bottom portion 27 having an opening 27a therein. The opening 27a allows a portion of the neck portion 60 of the clamping member 48 to extend therethrough.

Figure 11:
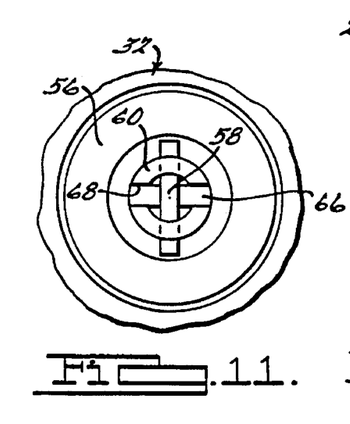
FIG. 11 is a top view of the locking mechanism of FIG. 3.

With further reference to FIGS. 3 and 11, the locking mechanism 46 further includes a second retaining pin 66 which is disposed within a bore 51 in the locking pin 50 generally transversely of the locking pin 58, and within a longitudinally extending slot 68 formed in the neck portion 60 of the clamping member 36. Also formed in the neck portion 60 is a concentrically positioned bore 70 which extends completely through the clamping member 48. The locking pin 50 is disposed. concentrically within the bore 70 (as is the first spring 52) and moves slidably longitudinally therein with and against the biasing force provided by the first spring 52. The locking pin 50 is further of a length such that an outermost end portion 72 extends into the aperture 44 when the retaining pin 66 is biased towards the lowermost portion of the elongated slot 68 as shown in FIG. 3.

Figures 4, 5, 12:
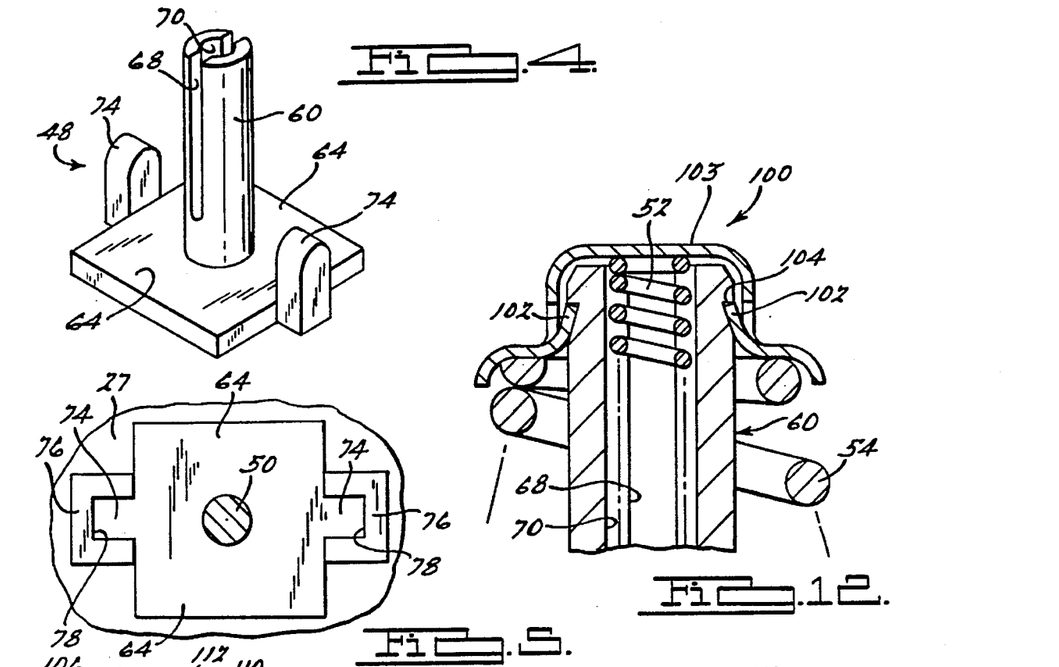
FIG. 4 is a perspective view of the clamping member of the present invention shown in FIG. 3.
FIG. 5 is a bottom view of the bracket member of FIG. 3.
FIG. 12 is a cross sectional view of an alternative preferred retaining member of the present invention.

Referring briefly to FIG. 4, the clamping member 48 by itself is shown. From FIG. 4 it can be seen that the clamping member 48 also includes a pair of upwardly extending arm portions 74 integrally formed with the clamping portions 64. Each arm portion 74 further includes an upper end portion 74a having a rounded surface.

With reference to FIG. 5, the bottom portion 27 of the bracket member 20 includes a pair of foot portions 76 which protrude outwardly therefrom. Each foot portion 76 includes a guide portion 78 which is adapted to slidably maintain the clamping portions 64 of the clamping member 48 in a desired orientation relative to the bottom portion 27, and further to prevent rotation of the clamping member 48. The foot portions 76 provide the added benefit of helping to guide the bracket member 20 along the support member 12 as each foot portion 76 is of a width to enable it to fit between the inwardly extending shoulder portions 42 (FIG. 3) and reside partially within the interior of the channel member 36, to thus help guide the bracket member 20 as same is moved longitudinally along the support member 12.

Figures 6, 7, 8, 9, 10:
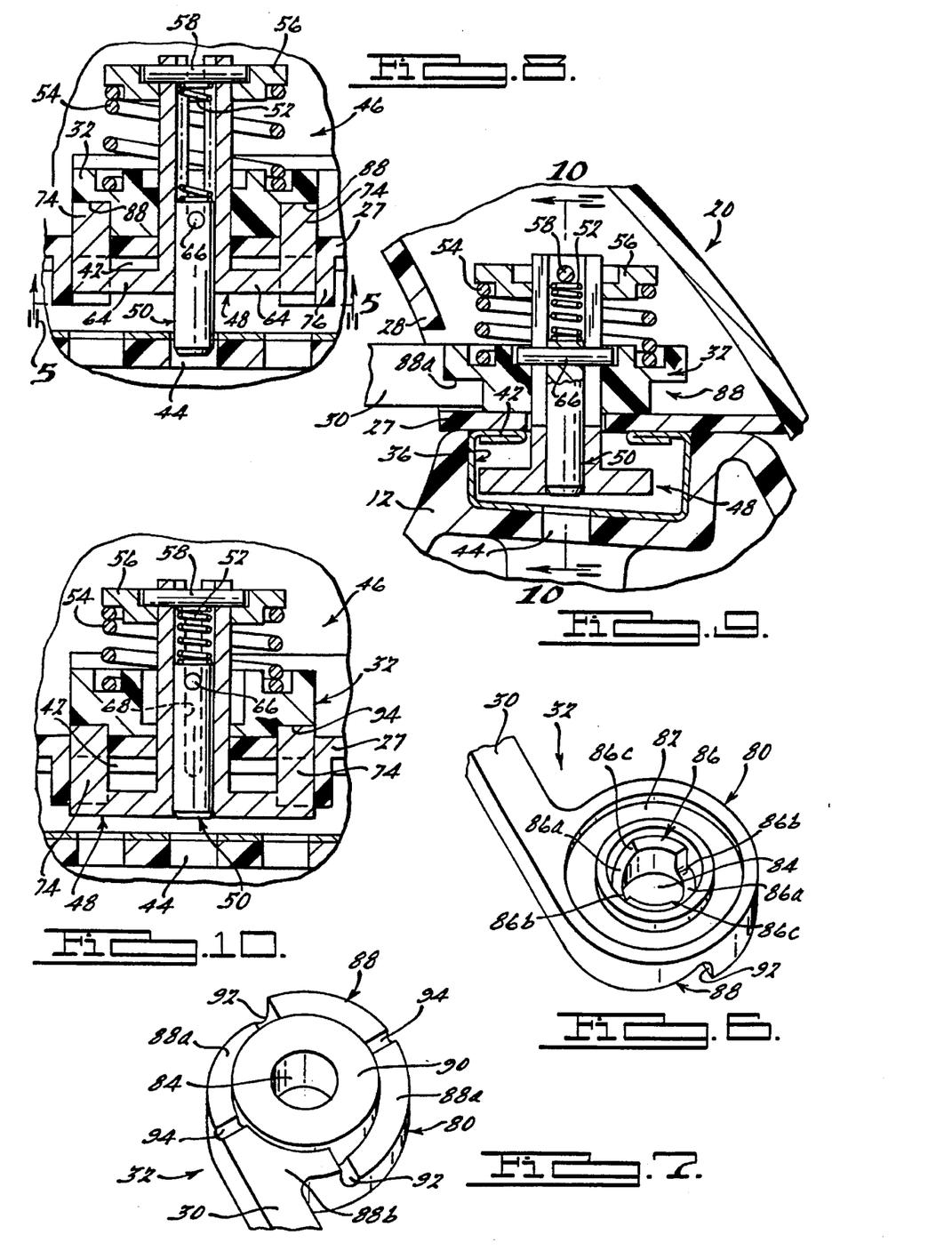
FIG. 6 is a fragmentary perspective view of the actuating member of the present invention.
FIG. 7 is a bottom view of the actuating member of FIG. 6 showing the actuating member upside down (i.e., rotated 180 degrees) to more positively illustrate the second camming surface thereof.
FIG. 8 is a cross sectional view of the apparatus in accordance with section line 8—8 of FIG. 3 while the bracket member is in its locked position relative to the support member.
FIG. 9 is a view of the apparatus as shown in FIG. 3 with the exception that the bracket member is shown in its unlocked position.
FIG. 10 is a cross sectional view of the locking means of the bracket member shown in FIG. 9 is accordance with section line 10—10 in FIG. 9.

Referring now to FIG. 6, the actuating member 32 is shown. The actuating member 32 includes the manually graspable end portion 30 (of which only a portion is shown in FIG. 6), an annular main body portion 80 having an annular recessed portion 82, a bore 84, a first camming surface 86 and a second camming surface 88. The annular recessed portion 82 is adapted to hold a portion of the second spring 54 therein (as seen in FIG. 3). The bore 84 allows the clamping member 48 to extend therethrough and to allow the actuating member 32 to be rotated relative to the clamping member 48. The first camming surface 86 further includes a pair of sloped first camming portions 86a having lowermost portions 86b.

Referring briefly now to FIG. 7, the second camming surface 88 is shown in more detail. The second camming surface 88 includes a pair of camming surfaces 88a which slope relative to a flat bottom surface 90 portion, which rests on an inner surface of the bottom portion 27 of the bracket member 20. The flat bottom surface 90 allows the actuating member 32 to be rotated relative to the bottom portion 27 of the bracket member 20 by the manually graspable end portion 30. Each of the camming portions 88a include a first detent 92 and a second detent 94.

Referring now to FIGS. 2, 3 and 8–10, the operation of the locking mechanism 46 will be described. Referring initially to FIG. 3, the locking mechanism 46 is shown in a locked position wherein the graspable end portion 30 is positioned within the recessed portion 26 (FIG. 2). The second retaining pin 66 rests at the lowermost portions 86b of the camming portions 86a. At the lowermost portions 86b on the camming surfaces 86a, the biasing force of the first spring 52 causes the retaining pin 66 to be urged to a point of maximum downward travel thus disposing the outermost end portion 72 of the locking pin 50 within the aperture 44.

With brief reference to FIG. 8, when the actuating member 32 is in the locked position, the upper ends 74a of the arm portions 74 are each drawn into an associated one of the first detents 92 in response to the biasing force of the second spring 54 against the annular retaining member 56 and retaining pin 58. The biasing force of the second spring 54 causes the clamping surfaces 64 to be held tightly against the inwardly extending shoulder portions 42. Accordingly, it should be appreciated that the locking mechanism 46 of the present invention effects a "double" locking action. The first component of this locking action is the locking pin 50 which engages within one of the apertures 44 when the actuating member 32 is in the locked position. The second component of the locking action is provided by the clamping member 48 which further helps to secure the bracket member 20 very securely to the support member 12 by its clamping action. Thus dual locking action provides extremely secure locking of the bracket member 20 to the support member 12.

Referring now to FIGS. 2, 9 and 10, as the actuating member 32 is moved rotatably to its unlocked position, wherein the manually graspable end portion 30 extends generally perpendicular to the inner surface 28 of the bracket member 20, the second retaining pin 66 is urged upwardly as it rides to uppermost portions 86c of the camming surfaces 86a. Thus, as the actuating member 32 is rotated, the second retaining pin 66 is urged upwardly relative to the bottom wall 38 of the channel member 36 against the biasing force of the first spring 52. At the same time that the actuating member 32 is being moved into the unlocked position shown in FIG. 9, the upper ends 74a of the arm portions 74 of the clamping member 48 are urged downwardly toward the bottom wall 38 as they move from out of the first detents 92, along camming portions 88a. When the graspable end portion 30 is extending approximately perpendicular to the inside surface 28 of the bracket member 20, the upper end portions 74a of the arm portions 74 are engaged within the second detents 94. Thus, movement of the upper end portions 74a along the camming portions 88a forces the arm portions 74 downwardly relative to the bottom portion 38, thus causing the clamping portions 64 to be moved out of clamping engagement with the inwardly extending shoulder portions 42. Thus, while the locking pin 50 is being withdrawn from the aperture, the clamping member 48 is also substantially simultaneously moved away from the inwardly extending shoulder portions 42 out of clamping engagement therewith. Thus, the dual locking action provided by the locking mechanism 46 is accomplished by a single movement of the actuating member 32, while the unlocking action is similarly accomplished by a single movement of the actuating member 32. The locking mechanism 46 of the present invention thus provides extremely secure locking engagement of a bracket member within a channel member, and further a "dual" locking action.

Referring briefly to FIG. 12, an alternative preferred retaining member 100 of the locking mechanism 46 is shown. The embodiment 100 includes a plurality of latching portions 102 which engage a notch 104 formed in the clamping member 48, and a top cover portion 103. The retaining member 100 is installed by simply pressing it over the clamping member 48.

Figure 13:
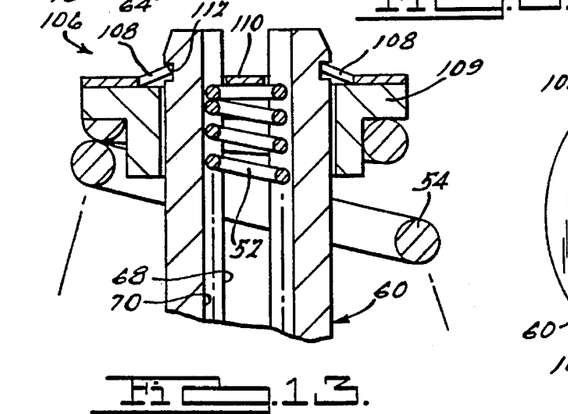
FIG. 13 is a cross sectional view of another alternative preferred retaining member of the present invention.
Figure 14:
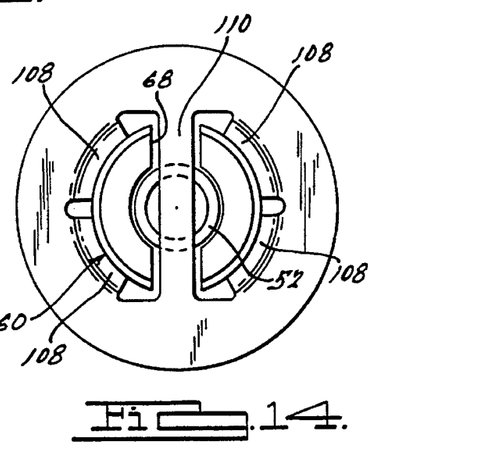
FIG. 14 is a top view of the retaining member of FIG. 13.

FIGS. 13 and 14 illustrate yet another preferred alternative retaining member 106. Retaining member 106 also has a plurality of latching portions 128, a central portion 110 which retains the spring 52, and a retainer helper member 102. The latching portions 108 similarly engage the notch 112 formed in the clamping member 48.

Figure 15:
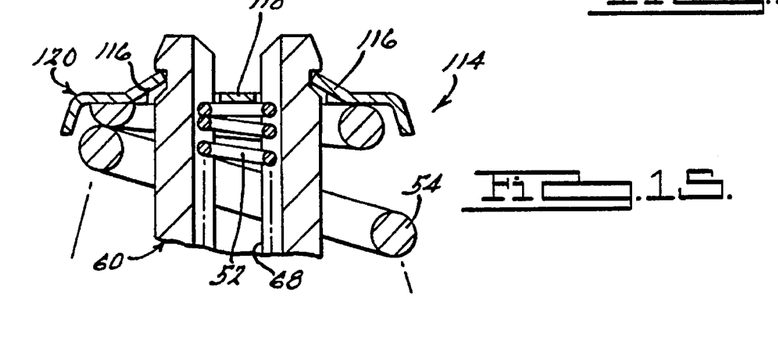
FIG. 15 is yet another alternative preferred retaining member of the present invention.

FIG. 15 illustrates yet another alternative preferred retaining member 114. Retaining member 114 also includes a plurality of arm portions 116, a central portion 118 and an edge portion 120 for maintaining it concentrically with the spring 54.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier comprising:

a pair of support members extending longitudinally along an outer body vehicle surface and fixedly secured to said outer body vehicle surface;

a bracket member disposed on at least one of said support members;

a cross bar secured to said bracket member such that movement of said bracket member along said one support member allows said cross bar to be adjustably positioned relative to said support member;

said bracket member including a locking assembly for releasably securing said bracket member to said one support member at a selected position along a length of said one support member;

said locking assembly including:
an actuating member having a manually graspable portion, a first camming surface and a second camming surface;
a locking pin; and
a clamping member;
said locking pin being moveable into locking engagement with said one support member by said first camming surface when said actuating member is moved into a locked position;
said clamping member being movable by said second camming surface into clamping engagement with said one support member when said actuating member is moved to said locked position; and
said locking pin being moved out of said locking engagement with said one support member by said first camming surface when said actuating member is moved to an unlocked position, and said clamping member being moveable out of said clamping engagement with said one support member when said actuating member is moved to said unlocked position.

2. The vehicle article carrier of claim 1, further comprising:

a first biasing member for biasing said locking pin into said locking engagement when said actuating member is moved to said locked position; and a second biasing member for biasing said clamping member into said clamping engagement when said actuating member is moved into said locked position.

3. The vehicle article carrier of claim 1, wherein said bracket member includes a foot portion adapted to guide said bracket member along said one support member.

4. The vehicle article carrier of claim 2, wherein said clamping member comprises a bore extending therethrough;

wherein said first biasing member is disposed within said bore; and wherein said locking pin is disposed slidably within said bore and urged outwardly of said bore by said first biasing member.

5. A vehicle article carrier comprising:

a pair of support members extending longitudinally along an outer body vehicle surface and fixedly secured to said outer body vehicle surface, each of said support members including a longitudinally extending channel having a plurality of apertures formed therein;

a bracket member adjustably disposed on each said support member;

a cross bar extending longitudinally between said bracket members and secured at its outermost ends to said bracket members;

at least one of said bracket members including:
an actuating member having a first camming surface and a second camming surface, said actuating member being adapted to be manually grasped and urged between a locked position and an unlocked position;
a locking pin operably associated with said actuating means and movable generally linearly into and out of locking engagement with said apertures in said channel;
a first biasing member operably associated with said first camming surface of said actuating member for causing said locking pin to be withdrawn from said locking engagement with one of said apertures when said actuating member is urged into said unlocked position;
a clamping member operably associated with said actuating member and disposed at least partially within said channel of an associated one of said support members;
a second biasing member for urging said clamping member into engagement with said channel of said associated support member, said clamping member being cooperable with said second camming surface such that movement of said actuating member towards said unlocked position causes said clamping member to be urged out of clamping engagement with said associated support member and movement of said actuating member into said locked position causes said clamping member to be urged into engagement with at least one wall portion of said channel of said associated support member.

6. The apparatus of claim 5, wherein said clamping member includes a concentrically disposed bore; and wherein said locking pin is slidably disposed within said bore.

7. The apparatus of claim 6, further comprising:

an annular retaining member disposed about an upper end portion of said clamping member; and a retaining pin for maintaining said annular retaining member to said clamping member against said biasing force of said second biasing member.

8. The apparatus of claim 7, wherein said first biasing member is disposed concentrically within said bore;

wherein said clamping member includes a longitudinal, elongated slot formed therein; and wherein said apparatus further comprises a second retaining pin disposed within said longitudinal elongated slot and cooperable with said first camming surface such that movement of said actuating member into said unlocked position causes said second retaining pin to be urged away from said channel by movement over said first camming surface and against said biasing force of said first biasing member.

9. The apparatus of claim 8, wherein said clamping member includes a neck portion; and wherein said neck portion includes said longitudinal elongated slot formed therein, said slot enabling said second locking pin to move longitudinally therein along a partial length of said neck portion.

10. A vehicle article carrier comprising:

a pair of elongated support members fixedly secured to an outer body surface of a vehicle;

said support members each including a channel formed therein, each said channel including a channel member having a pair of inwardly extending shoulder portions and a bottom wall portion having a plurality of spaced apart apertures extending generally linearly along a major portion of the length of its associated said channel;

a bracket member slidably and adjustably disposed on each one of said support members;

a cross bar fixedly secured at each of its outermost ends to said bracket members for supporting articles thereon;

each of said bracket members including a locking assembly for releasably locking each of said bracket members adjustably at a selected position along said support members, each said locking assembly including:

an actuating member having a manually graspable end portion, a main body portion having at least one first camming surface and at least one second camming surface, and a bore disposed concentrically within said main body portion, said actuating member being movable between a locked position and an unlocked position;

a clamping member concentrically disposed within said annular main body portion and adapted to move generally linearly relative to said annular main body portion, said clamping member being movable between an unclamped position and a clamped position, wherein in said clamped position said clamping member is engaged with said inwardly extending shoulder portions of its associated channel member;

a locking pin disposed concentrically within said bore of said clamping member and movable longitudinally therein;

a first biasing member disposed concentrically within said bore for biasing said locking pin such that an outermost end portion thereof extends into locking engagement with a selected one of said apertures in said bottom wall portion of said associated channel member when said locking pin is positioned over said selected aperture;

a retaining member for retaining said locking pin at least partially within said clamping member against said biasing force of said first biasing member;

a second biasing member for biasing said clamping member into said clamping engagement with said inwardly extending shoulder portions of said associated channel member when said actuating member is in said locked position;

said first camming surface causing said retaining means to urge said locking pin linearly away from said bottom wall portion of said channel member when said manually graspable end portion of said actuating member is moved from said locked position to said unlocked position; and said second camming surface causing said clamping member to be urged away from said inwardly extending shoulder portions and therefore out of locking engagement with said associated channel member when said manually graspable end portion is moved from said locked position to said unlocked position.

11. The apparatus of claim 10, wherein said clamping member comprises at least one arm portion for engaging said second camming surface when said actuating member is rotated.

12. The apparatus of claim 11, wherein said bracket member includes a foot portion for guiding said bracket member along said channel member; and wherein said foot portion includes a guide portion for cooperating with said arm portion of said clamping member to prevent said clamping member from rotating relative to said bracket member.

13. The apparatus of claim 12, wherein said second camming surface includes a first pair of detents for helping to hold said actuating member in said locked position when said manually graspable end portion is moved into said locked position; and wherein said second camming surface includes a second pair of detents positioned approximately 90 degrees from said first pair of detents for cooperating with said arm portion of said clamping member to maintain said actuating member in said unlocked position when said manually graspable end portion is moved into said unlocked position.

14. A vehicle article carrier comprising:

a pair of support members extending longitudinally along an outer body vehicle surface and fixedly secured to said outer body vehicle surface;

a bracket member disposed on at least one of said support members;

a cross bar secured to said bracket member such that movement of said bracket member along said one support member allows said cross bar to be adjustably positioned relative to said support members;

said bracket member including a locking assembly for releasably securing said bracket member to said one support member at a selected position along a length of said one support member;

said locking assembly including:

an actuating member having a manually graspable portion, a first camming surface and a second camming surface;

a locking member;

a clamping member;

wherein said first camming surface operates to urge said locking member into locking engagement with said one support member when said actuating member is urged into a locked position and to enable said locking member to be moved out of locking engagement when said actuating member is moved into an unlocked position; and wherein said second camming surface operates to urge said clamping member into clamping engagement with said one support member when said actuating member is moved into said locked position, and to enable said clamping member to be moved out of said clamping engagement when said actuating member is moved into said unlocked position.

15. The article carrier of claim 14, wherein said locking member and said clamping member are urged into engagement with said one support member substantially simultaneously as said actuating member is urged into said locked position.

16. The article carrier of claim 14, wherein said locking member and said clamping member are urged out of engagement with said one support member substantially simultaneously when said actuating member is urged from said locked position into an unlocked position.

17. A vehicle article carrier comprising:

a pair of support members extending longitudinally along an outer body vehicle surface and fixedly secured to said outer body vehicle surface;

a bracket member disposed on at least one of said support members;

a cross bar secured to said bracket member such that movement of said bracket member along said one support member allows said cross bar to be adjustably positioned relative to said support member;

said bracket member including a locking assembly for releasably securing said bracket member to said one support member at a selected position along a length of said one support member;

said locking assembly including:

an actuating member having a manually graspable portion, a first circumferential camming surface and a second circumferential camming surface disposed coaxially relative to said first circumferential camming surface;

a locking member cammingly urgeable into locked and unlocked positions by one of said first and second circumferential camming surfaces in response to rotational movement of said actuating member;

a clamping member cammingly moveable into clamped and unclamped positions relative to said one support member by the other one of said first and second circumferential camming surfaces in response to rotational movement of said actuating member.

18. The vehicle article carrier of claim 17, wherein said locking member is disposed along a vertical axis of rotation of said actuating member.

19. The vehicle article carrier of claim 17, wherein the locking member is disposed coaxially relative to said clamping member.

20. The vehicle article carrier of claim 17, wherein said first and second locking member and said clamping member are urged into locking and clamping engagement, respectively, with said one support member substantially simultaneously when said actuating member is rotated into a locked position, and urged out of locking and clamping engagement substantially simultaneously when said actuating member is rotated into an unlocked position.

* * * * *